(12) United States Patent
Lu et al.

(10) Patent No.: US 11,504,613 B2
(45) Date of Patent: Nov. 22, 2022

(54) GAME CONTROLLER

(71) Applicant: DEXIN CORPORATION, New Taipei (TW)

(72) Inventors: Ho-Lung Lu, New Taipei (TW); Chin-Lung Lin, New Taipei (TW); Hsiu-Hsuan Lin, Taipei (TW)

(73) Assignee: DEXIN CORPORATION, New Taipei (TW)

( * ) Notice: Subject to any disclaimer, the term of this patent is extended or adjusted under 35 U.S.C. 154(b) by 0 days.

(21) Appl. No.: 17/164,965

(22) Filed: Feb. 2, 2021

(65) Prior Publication Data
US 2022/0072416 A1   Mar. 10, 2022

(30) Foreign Application Priority Data
Sep. 7, 2020   (TW) .................................. 109211674

(51) Int. Cl.
*A63F 13/24* (2014.01)
(52) U.S. Cl.
CPC .................................... *A63F 13/24* (2014.09)

(58) Field of Classification Search
None
See application file for complete search history.

(56) References Cited

U.S. PATENT DOCUMENTS

| | | | |
|---|---|---|---|
| 2015/0281422 A1* | 10/2015 | Kessler | H04W 4/80 455/557 |
| 2017/0056762 A1* | 3/2017 | Gafni | A63F 13/235 |
| 2017/0060185 A1* | 3/2017 | Conners | G06F 13/4081 |

* cited by examiner

*Primary Examiner* — James S. McClellan
*Assistant Examiner* — Peter J Iannuzzi
(74) *Attorney, Agent, or Firm* — Li & Cai Intellectual Property (USA) Office (57) ABSTRACT

A game controller is provided. The game controller includes a first handle body. The first handle body includes a first control module, a first operation interface, a first connection portion and a second connection portion. The first connection portion is a male connector. The first handle body is connected to a mobile device through the first connection portion. The second connection portion is a female connector. The first handle body is connected to a second handle body through the second connection portion and a signal transmission wire. A first terminal and a second terminal of the signal transmission wire each includes a male connector.

11 Claims, 7 Drawing Sheets

GAME CONTROLLER

CROSS-REFERENCE TO RELATED PATENT APPLICATION

This application claims the benefit of priority to Taiwan Patent Application No. 109211674, filed on Sep. 7, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a game controller, and more particularly to a separable game controller.

BACKGROUND OF THE DISCLOSURE

In a conventional game controller including two matching handle bodies, each of the two matching handle bodies cannot be matched with other handle bodies. When one of the two handle bodies is damaged or missing, another full set of game controller needs to be purchased for replacement, which causes inconvenience both in cost and in use.

Accordingly, how a game controller that can be used with a single handle body and that can easily match with other handle bodies can be provided has become one of the important issues to be solved in the relevant field.

SUMMARY OF THE DISCLOSURE

In response to the above-referenced technical inadequacies, the present disclosure provides a game controller that includes a first handle body. The first handle body includes a first control module, a first operation interface, a first connection portion, and a second connection portion. The first operation interface is electrically connected to the first control module. The first connection portion is electrically connected to the first operation interface, the first connection portion is a male connector, and the first handle body connects to a mobile device through the first connection portion. The second connection portion is electrically connected to the first control module, and the second connection portion is a female connector. The first handle body is connected to a second handle body through the second connection portion and a signal transmission wire, and a first terminal and a second terminal of the signal transmission wire are both male connectors.

In another aspect, the present disclosure provides a game controller that includes a first handle body and a second handle body. The first handle body includes a first control module, a first operation interface, a first connection portion, a first operation interface, and a second connection portion. The first operation interface is electrically connected to the control module. The first connection portion is electrically connected to the first operation interface. The first connection portion is a male connector. The first handle body is connected to a mobile device through the first connection portion. The second connection portion is electrically connected to the first control module. The second connection portion is a female connector. The second handle body includes a second operation interface and a third connection portion. The first handle body is connected to the third connection portion of the second handle body through the second connection portion and a signal transmission wire. A first terminal and a second terminal of the signal transmission wire are each a male connector. The third connection portion is electrically connected to the second operation interface. The first terminal of the signal transmission wire is electrically connected to the second connection portion. The second terminal of the signal transmission wire electrically is connected to the third connection portion of the second handle body.

One of the beneficial effects of the present disclosure is that, a second connection portion can be disposed in the first handle body of the game controller of the present disclosure, and the first handle body can be electrically connected to the second handle body through a signal transmission wire. Since components can be conveniently disassembled, the game controller is more flexible in use. In addition, adjustments can be made to produce different combinations of handle bodies according to a grip feeling of the user, so as to improve the user experience.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 1:
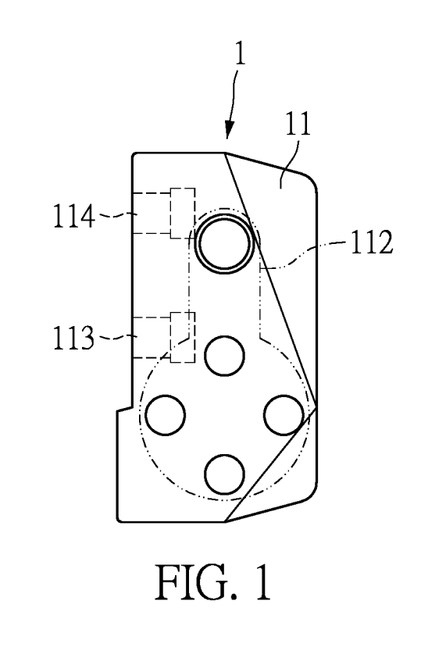
FIG. 1 is a schematic view of a first handle body of a game controller according to a first embodiment of the present disclosure.
Figure 2:
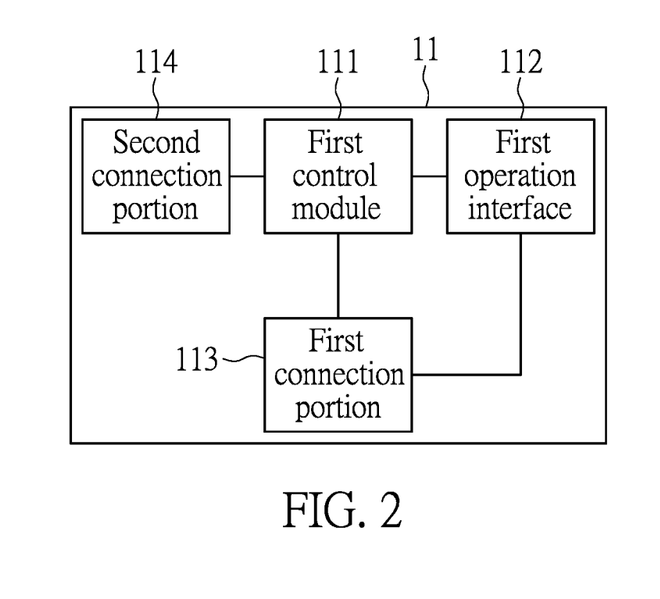
FIG. 2 is a functional block diagram of the first handle body of the game controller of FIG. 1.
Figure 3:
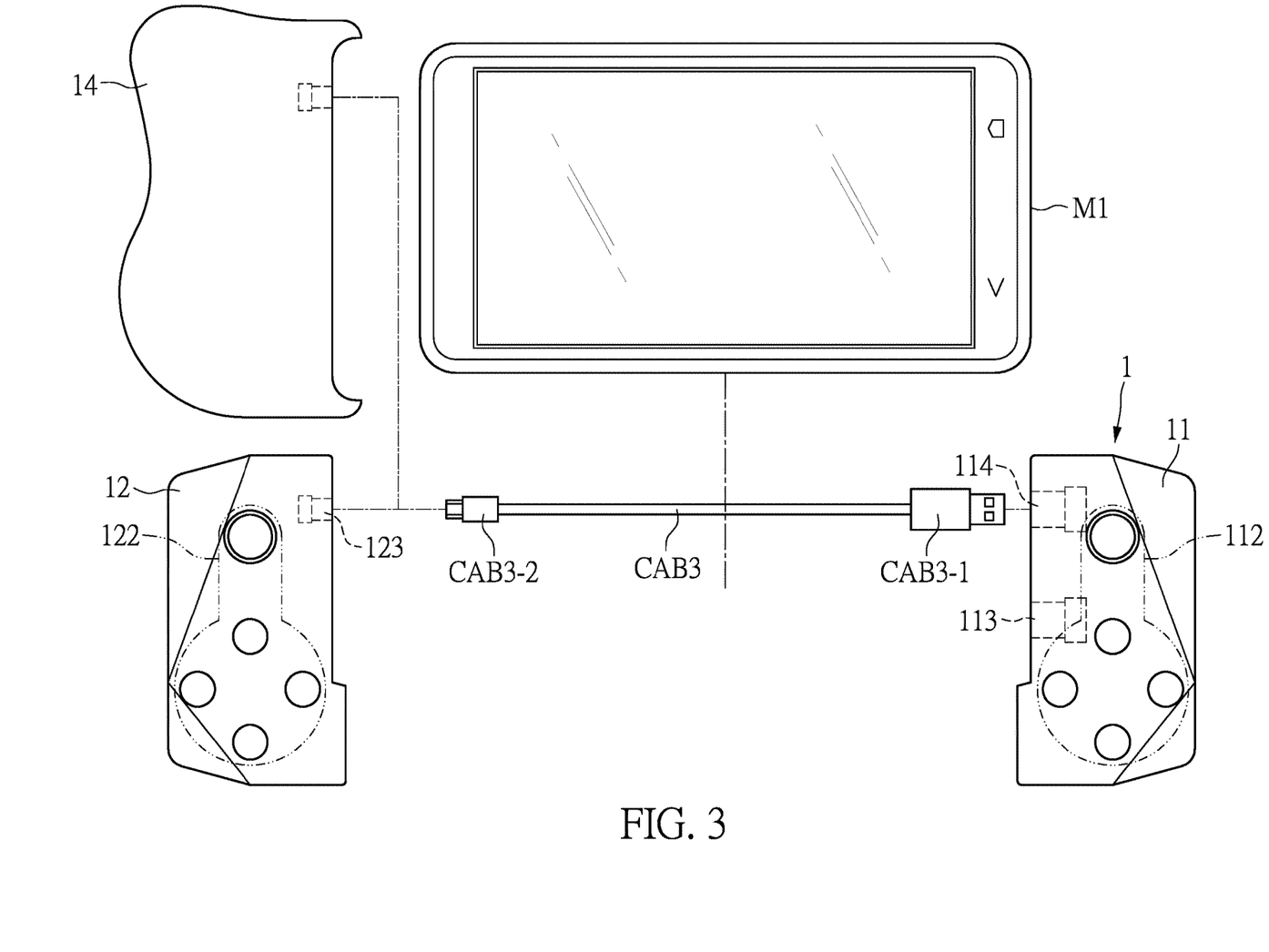
FIG. 3 is a schematic view of the first handle body matching with a second handle body of the game controller according to the first embodiment of the present disclosure.
Figure 4:
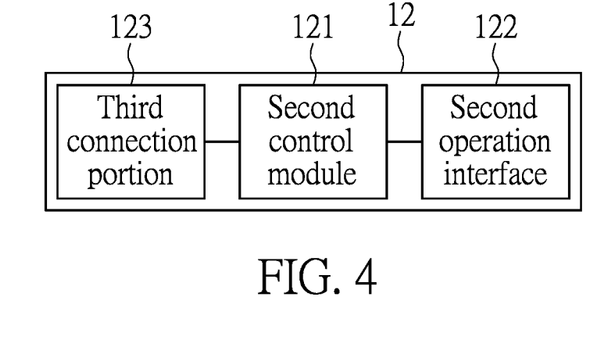
FIG. 4 is a functional block diagram of the second handle body of FIG. 3.
Figure 5:
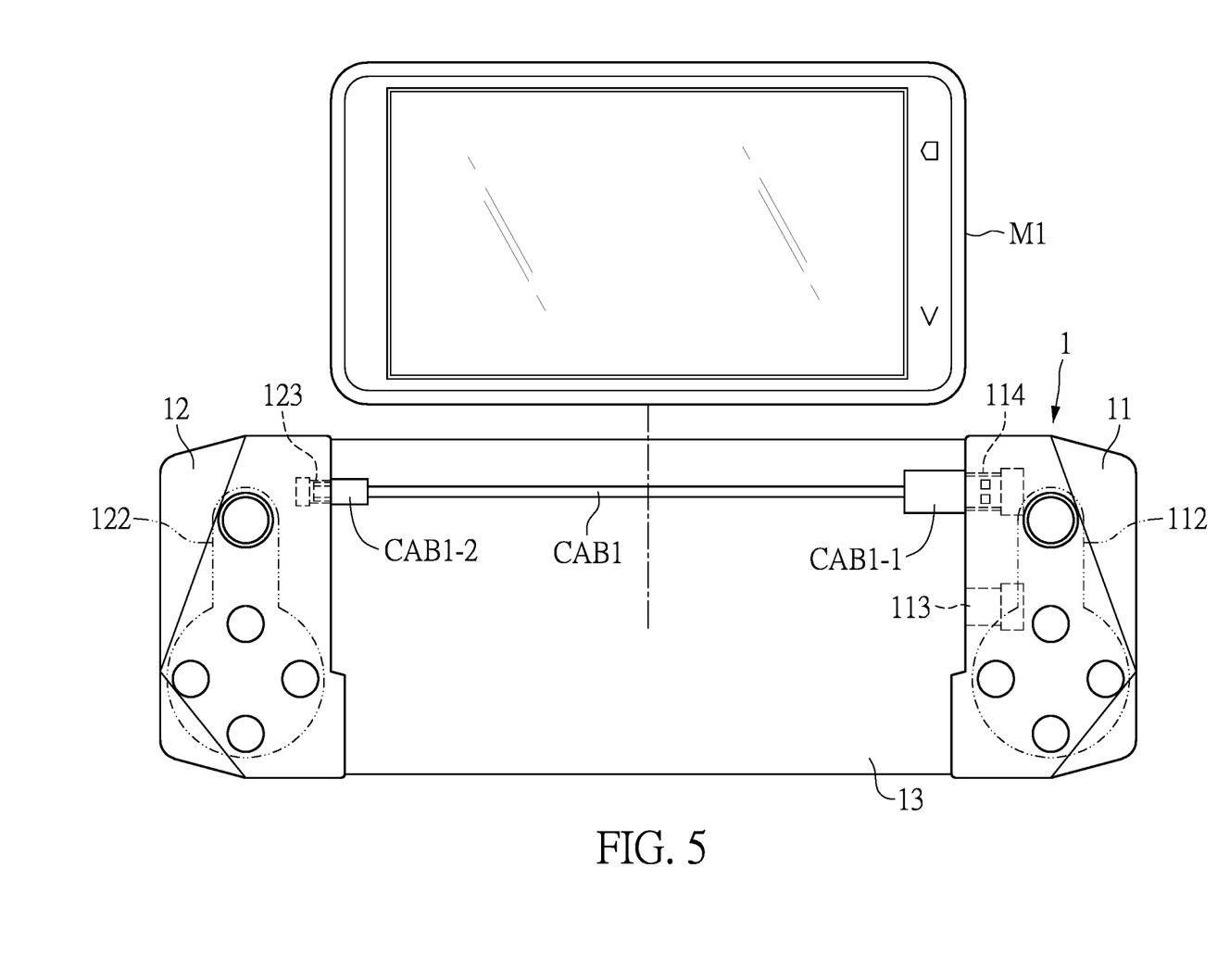
FIG. 5 is a schematic view of the first handle body matching with the second handle body through a connection module according to the first embodiment of the present disclosure.

Referring to FIG. 1 to FIG. 5, a first embodiment of the present disclosure provides a first handle body of a game controller as illustrated in FIG. 1. FIG. 2 is a functional block diagram of the first handle body of the game controller of FIG. 1. FIG. 3 is a schematic view of the first handle body matching a second handle body of the game controller according to the first embodiment of the present disclosure. FIG. 4 is a functional block diagram of the second handle body of FIG. 3. FIG. 5 is a schematic view of the first handle body matching with the second handle body through a connection module according to the first embodiment of the present disclosure.

Referring to FIG. 1 to FIG. 3, the game controller 1 includes at least a first handle body 11. The first handle body 11 includes a first control module 111, a first operation interface 112, a first connection portion 113 and a second connection portion 114. The first operation interface 112 is connected to the first control module 111.

The first connection portion 113 is electrically connected to the first operation interface 112. The first connection portion 113 is a male connector. The first handle body 11 is connected to a mobile device M1 through the first connection portion 113. The second connection portion 114 is a female connector. In the present embodiment, the first connection portion 113 and the second connection portion 114 are disposed on one side of the first handle body 11.

Referring to FIG. 2, additionally, the first handle body 11 can be connected to a second handle body 12 through the second connection portion 114 and a signal transmission wire CAB1. A first terminal CAB1-1 and a second terminal CAB1-2 of the signal transmission wire CAB1 each includes a male connector.

In the present embodiment, the male connectors of the first terminal CAB1-1 and the second terminal CAB1-2 of the signal transmission wire CAB1 can each be a Type-A universal serial bus (USB) connector, a Type-C USB connector, a micro USB connector, or a LIGHTNING connector.

Referring to FIG. 4, the second handle body 12 includes a second control module 121, a second operation interface 122 and a third connection portion 123.

The second control module 121 is electrically connected to the second operation interface 122 and the third connection portion 123. The third connection portion 123 is electrically connected to the second operation interface 122.

In the present embodiment, the second connection portion 114 of the first handle body 11 is connected to the third connection portion 123 of the second handle body 12 through the signal transmission wire CAB1. The second connection portion 114 of the first handle body 11 and the third connection portion 123 of the second handle body 12 are female connectors. Moreover, the second connection portion 114 of the first handle body 11 and the third connection portion 123 of the second handle body 12 can be the same connector or different connectors, and it is not limited in the present disclosure. In addition, the third connection portion 123 of the second handle body 12 can be a detachable connector or a connector having a telescopic structure. The first connection portion 113, the second connection portion 114 and the third connection portion 123 can each be a Type-A USB connector, a Type-C USB connector, a micro USB connector or a LIGHTNING connector.

In the present embodiment, the first terminal CAB1-1 of the signal transmission wire CAB1 is electrically connected to the second connection portion 114 of the first handle body 11. The second terminal CAB1-2 of the signal transmission wire CAB1 is electrically connected to the third connection portion 123 of the second handle body 12.

When the first handle body 11 and the second handle body 12 are connected through the signal transmission wire CAB1, a plurality of control signals of the first operation interface 112 are first transmitted to the first control module 111, and then the first control module 111 transmits the plurality of control signals of the first operation interface 112 to the mobile device M1 through the first connection portion 113. At this time, a plurality of control signals of the second operation interface 122 are transmitted to the first control module 111 through the third connection portion 123, the signal transmission wire CAB1 and the second connection portion 114, and the first control module 111 transmits the plurality of control signals of the second operation interface 122 to the mobile device M1.

When the first handle body 11 and the second handle body 12 are connected through the signal transmission wire CAB1, the first control module 111 of the first handle body 11 transmits a signal to be verified to the second handle body 12, and the second handle body 12 transmits a device verification code to the first handle body 11 based on the signal to be verified. The first control module 111 of the first handle body 11 determines whether or not the device verification code of the second handle body 12 matches with the first handle body 11.

That is, when the first handle body 11 and the second handle body 12 are electrically connected, the first handle body 11 transmits a verification signal to the second handle body 12. The signal to be verified of the first handle body 11 and the device verification code of the second handle body 12 can be achieved through an identification code, a voltage signal, a current signal, a pin setting of the connection portion, a custom communication protocol, or the like.

In addition, the first control module 111 and the second control module 121 of the first handle body 11 transmit a plurality of signals of a serial peripheral interface communication protocol or an inter-integrated circuit communication protocol to the second control module 121 and the first control module 111, respectively.

Further, one side of the first handle body 11 includes an accommodation space. The mobile device M1 is disposed in the accommodation space of the first handle body 11 and is electrically connected to the first connection portion 113.

Referring to FIG. 5, in the present embodiment, the game controller 1 can further include a connection module 13. The connection module 13 is disposed between the first handle body 11 and the second handle body 12. The connection module 13 is connected to the first handle body 11 and the second handle body 12. The signal transmission wire CAB1 can be disposed in the connection module 13.

The first control module 111 and the second control module 121 can each be a central processing unit (CPU), a microcontroller or an application specific integrated circuit (ASIC).

The first operation interface 112 and the second operation interface 122 can each be a button, a joystick, a touch interface, or the like.

In the present embodiment, the second handle body 12 can be a handle body of different model and size from the first handle body 11 when manufactured, as long as the second handle body 12 can pass the verification procedure of the first handle body 11. For example, the first handle body 11 in FIG. 2 can be electrically connected to the third handle body 14 and verify the third handle body 14.

In another embodiment, the first handle body 11 and the second handle body 12 can transmit signals to be verified to each other to verify each other.

Second Embodiment

Figure 6:
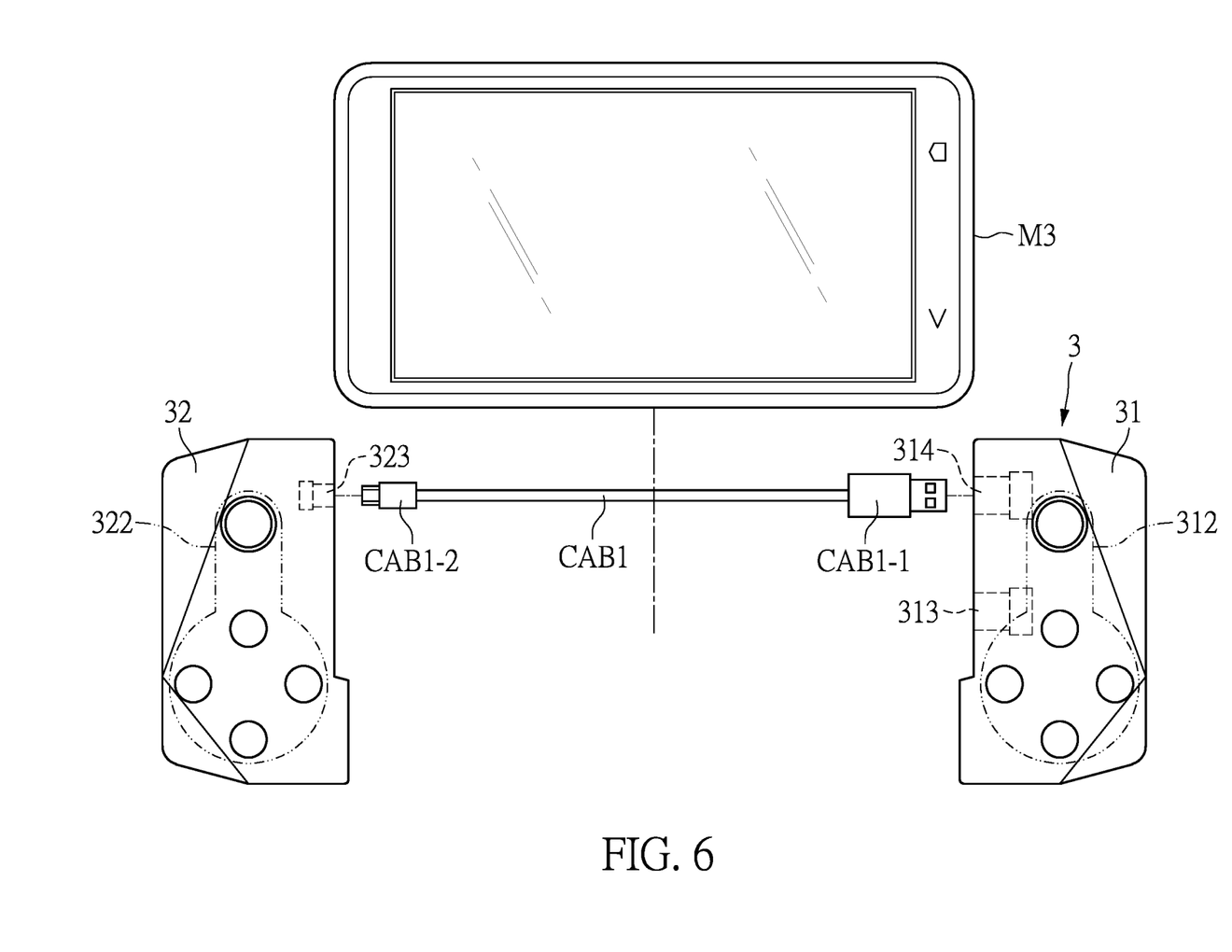
FIG. 6 is a schematic view of a game controller according to a second embodiment of the present disclosure.
Figure 7:
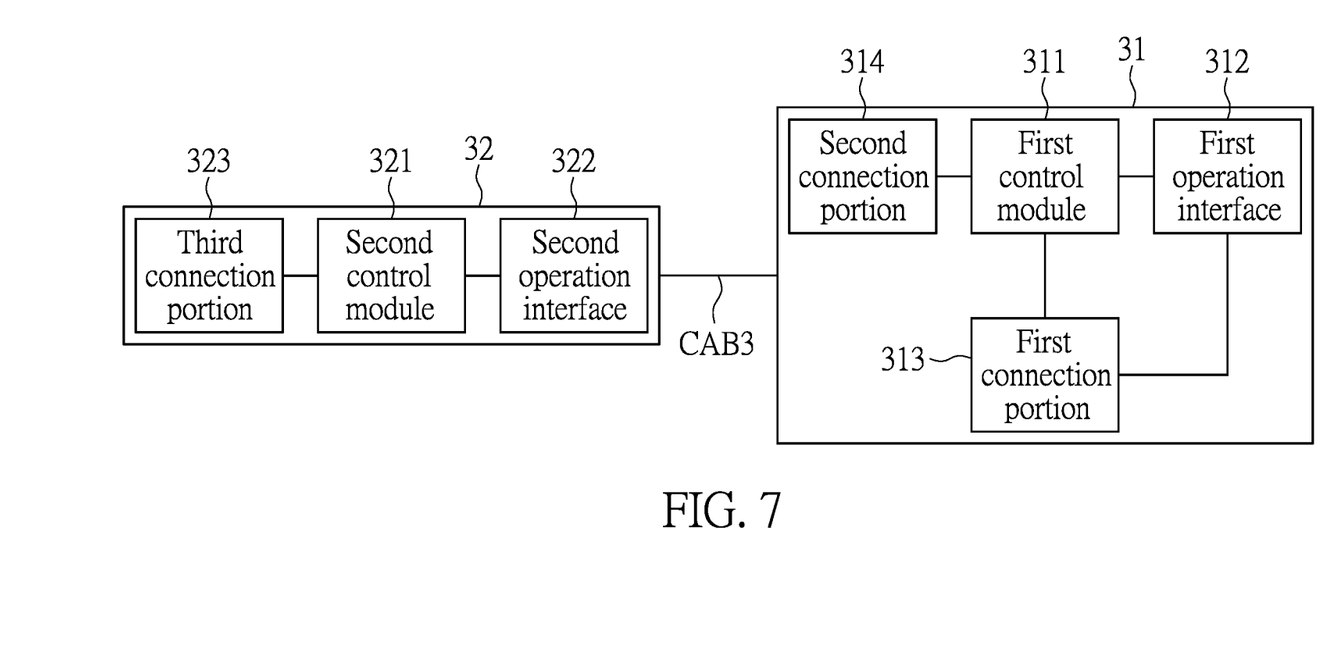
FIG. 7 is a functional block diagram of a first handle body and a second handle body of FIG. 6.

Referring to FIG. 6 and FIG. 7, FIG. 6 is a schematic view of a game controller according to a second embodiment of the present disclosure, and FIG. 7 is a functional block diagram of the first handle body and the second handle body of FIG. 6.

A first handle body 31 and a second handle body 32 of a game controller 3 in the present embodiment are two matched handle bodies of the game controller 3 of the same model.

Referring to FIG. 6, the game controller 3 includes the first handle body 31, the second handle body 32 and a signal transmission wire CAB3.

Referring to FIG. 7, the first handle body 31 includes a first control module 311, a first operation interface 312, a first connection portion 313 and a second connection portion 314. The first operation interface 312 is electrically connected to the first control module 311. The first connection portion 313 is electrically connected to the first operation interface 312. The first connection portion 313 is a male connector. The first handle body 31 is connected to a mobile device M3 through the first connection portion 313. The second connection portion 314 is electrically connected to the first control module 111. The second connection portion 314 is a female connector. In the present embodiment, the first connection portion 313 and the second connection portion 314 are disposed on one side of the first handle body 31.

The second handle body 32 includes a second control module 321, a second operation interface 322 and a third connection portion 323. The second control module 321 is electrically connected to the second operation interface 322 and the third connection portion 323. The third connection portion 323 is electrically connected to the second operation interface 322.

The first handle body 31 can be connected to the second handle body 32 through the second connection portion 314 and the signal transmission wire CAB3. A first terminal CAB3-1 and a second terminal CAB3-2 of the signal transmission wire CAB3 each includes a male connector.

In the present embodiment, the second connection portion 314 of the first handle body 31 is electrically connected to the third connection portion 323 of the second handle body 32 through the signal transmission wire CAB3. The second connection portion 314 of the first handle body 31 and the third connection portion 323 of the second handle body 32 are each a female connector. Further, the second connection portion 314 of the first handle body 31 and the third connection portion 323 of the second handle body 32 can be the same connector or different connectors, and it is not limited in the present disclosure. In addition, the third connection portion 323 of the second handle body 32 is a detachable connector or a connector having a telescopic structure. The first connection portion 313, the second connection portion 314 and the third connection portion 323 can each be a Type-A USB connector, a Type-C USB connector, a micro USB connector or a LIGHTNING connector.

In the present embodiment, the male connector of the first terminal CAB3-1 of the signal transmission wire CAB3 and the male connector of the second terminal CAB3-2 of the signal transmission wire CAB3 can each be a Type-A USB connector, a Type-C USB connector, a micro USB connector or a LIGHTNING connector.

When the first handle body 31 and the second handle body 32 are connected through the signal transmission wire CAB3, a plurality of control signals of the first operation interface 312 are first transmitted to the first control module 311, and then the first control module 311 transmits the plurality of control signals of the first operation interface 312 to the mobile device M3 through the first connection portion 313. At this time, a plurality of control signals of the second operation interface 322 are transmitted to the first control module 311 through the third connection portion 323, the signal transmission wire CAB3 and the second connection portion 314, and the first control module 311 transmits the plurality of control signals of the second operation interface 322 to the mobile device M3.

When the first handle body 31 and the second handle body 32 are connected through the signal transmission wire CAB3, the first control module 311 of the first handle body 31 transmits a signal to be verified to the second handle body 32, and the second handle body 32 transmits a device verification code to the first handle body 31 based on the signal to be verified. The first control module 311 of the first handle body 31 determines whether or not the device verification code of the second handle body 32 matches with the first handle body 31.

That is, when the first handle body 31 and the second handle body 32 are electrically connected, the first handle body 31 transmits a verification signal to the second handle body 32. The signal to be verified of the first handle body 31 and the device verification code of the second handle body 32 each can be achieved through an identification code, a voltage signal, a current signal, a pin setting of the connection portion, a custom communication protocol, or the like.

In addition, the first control module 311 and the second control module 321 of the first handle body 31 transmit a plurality of signals of a serial peripheral interface communication protocol or an inter-integrated circuit communication protocol to the second control module 321 and to the first control module 311, respectively.

In the present embodiment, when the second handle body 32 is damaged or missing, users can replace the damaged or the missing second handle body 32 with another second handle body 32 of the same model, or with a second handle body that can be verified by the first handle body 31, as described in the first embodiment.

Beneficial Effects of the Embodiments

In conclusion, one of the beneficial effects of the present disclosure is that a second connection portion can be disposed in the first handle body of the game controller of the present disclosure, and the first handle body can be electrically connected to the second handle body through a signal transmission wire. Since components can be conveniently disassembled, the game controller is more flexible in use. In addition, adjustments can be made to produce different combinations of handle bodies according to a grip feeling of the user, so as to improve the user experience.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A game controller, comprising:
a first handle body including:
a first control module;
a first operation interface electrically connected to the first control module;
a first connection portion electrically connected to the first operation interface, the first connection portion being a male connector, and the first handle body connecting to a mobile device through the first connection portion; and
a second connection portion electrically connected to the first control module, and the second connection portion being a female connector;
wherein the first handle body is connected to a second handle body through the second connection portion and a signal transmission wire, and a first terminal and a second terminal of the signal transmission wire are both male connectors;
wherein, when the first handle body is connected to the second handle body through the signal transmission wire, the first control module of the first handle body transmits a signal to be verified to the second handle body, the second handle body transmits a device verification code to the first handle body based on the signal to be verified, and the first control module of the first handle body determines whether or not the device verification code matches with the first handle body.

2. The game controller of claim 1, wherein the second handle body includes a second operation interface and a third connection portion, the third connection portion is electrically connected to the second operation interface, the first terminal of the signal transmission wire is electrically connected to the second connection portion, and the second terminal of the signal transmission wire is connected to the third connection portion of the second handle body.

3. The game controller of claim 2, wherein a plurality of control signals of the first operation interface are transmitted to the first control module, the first control module transmits the plurality of control signals of the first operation interface to the mobile device through the first connection portion, and wherein, when a plurality of control signals of the second operation interface are transmitted to the first control module through the third connection portion, the signal transmission wire and the second connection portion, the first control module transmits the plurality of control signals of the second operation interface to the mobile device.

4. The game controller of claim 2, wherein the third connection portion of the second handle body is a detachable connector or a connector having a telescopic structure.

5. The game controller of claim 1, wherein the second handle body further includes a second control module, and wherein the second control module transmits the device verification code of the second handle body to the first handle body based on the signal to be verified.

6. The game controller of claim 5, wherein the first control module and the second control module transmit a plurality of signals of a serial peripheral interface communication protocol or an inter-integrated circuit communication protocol to the second control module and to the first control module, respectively.

7. The game controller of claim 1, wherein the first handle body includes an accommodation space, the mobile device being disposed in the accommodation space and being electrically connected to the first connection portion.

8. A game controller, comprising:
a first handle body including:
a first control module;
a first operation interface electrically connected to the first control module;
a first connection portion electrically connected to the first operation interface, the first connection portion being a male connector, and the first handle body connecting to a mobile device through the first connection portion;
a second connection portion electrically connected to the first control module, and the second connection portion being a female connector;
a second handle body, wherein the first handle body is connected to a second handle body through the second connection portion and a signal transmission wire, and a first terminal and a second terminal of the signal transmission wire are both male connectors; and
a connection module disposed between the first handle body and the second handle body, the connection module connecting to the first handle body and the second handle body, and the signal transmission wire being disposed in the connection module.

9. A game controller, comprising:
a first handle body including:
a first control module;
a first operation interface electrically connected to the control module;
a first connection portion electrically connected to the first operation interface, the first connection portion being a male connector, and the first handle body connecting to a mobile device through the first connection portion; and
a second connection portion electrically connected to the first control module, and the second connection portion being a female connector; and a second handle body including a second operation interface and a third connection portion;
wherein the first handle body is connected to the third connection portion of the second handle body through the second connection portion and a signal transmission wire, a first terminal and a second terminal of the signal transmission wire are each a male connector, the third connection portion is electrically connected to the second operation interface, the first terminal of the signal transmission wire is electrically connected to the second connection portion, and the second terminal of the signal transmission wire is electrically connected to the third connection portion of the second handle body;
wherein, when the first control module of the first handle body transmits a signal to be verified to the second handle body, the second handle body transmits a device verification code to the first handle body based on the signal to be verified, and the first control module of the first handle body determines whether or not the device verification code matches with the first handle body.

10. The game controller of claim 9, wherein a plurality of control signals of the first operation interface are transmitted to the first control module, the first control module transmits the plurality of control signals of the first operation interface to the mobile device through the first connection portion, and wherein, when a plurality of control signals of the second operation interface are transmitted to the first control module through the third connection portion, the signal transmission wire and the second connection portion, the first control module transmits the plurality of control signals of the second operation interface to the mobile device.

11. The game controller of claim 9, wherein the first control module and the second control module transmit a plurality of signals of a serial peripheral interface communication protocol or an inter-integrated circuit communication protocol to the second control module and to the first control module, respectively.

* * * * *